(12) United States Patent
Ramic et al.

(10) Patent No.: US 8,261,183 B2
(45) Date of Patent: Sep. 4, 2012

(54) METHOD AND APPARATUS FOR DYNAMIC MANAGEMENT OF DISTRIBUTED CONTEXT

(75) Inventors: Haris Ramic, Chicago, IL (US); Thomas M. Tirpak, Glenview, IL (US)

(73) Assignee: Motorola Mobility LLC, Libertyville, IL (US)

( * ) Notice: Subject to any disclaimer, the term of this patent is extended or adjusted under 35 U.S.C. 154(b) by 529 days.

(21) Appl. No.: 12/503,126

(22) Filed: Jul. 15, 2009

(65) Prior Publication Data

US 2011/0016375 A1    Jan. 20, 2011

(51) Int. Cl.
    *G06F 17/00* (2006.01)
(52) U.S. Cl. ........................... 715/231; 715/230
(58) Field of Classification Search ............ 715/200, 715/230, 231, 232, 233
    See application file for complete search history.

(56) References Cited

U.S. PATENT DOCUMENTS

| | | | |
|---|---|---|---|
| 6,044,466 A | 3/2000 | Anand et al. | |
| 6,633,742 B1 * | 10/2003 | Turner et al. | 434/350 |
| 6,681,107 B2 | 1/2004 | Jenkins et al. | |
| 7,228,281 B1 | 6/2007 | Ney et al. | |
| 7,904,827 B2 * | 3/2011 | Taniguchi et al. | 715/788 |
| 2002/0184610 A1 * | 12/2002 | Chong et al. | 717/109 |
| 2003/0182168 A1 | 9/2003 | Lyons | |
| 2005/0043060 A1 * | 2/2005 | Brandenberg et al. | 455/558 |
| 2005/0091193 A1 * | 4/2005 | Frank et al. | 707/1 |
| 2005/0091209 A1 * | 4/2005 | Frank et al. | 707/3 |
| 2005/0091578 A1 * | 4/2005 | Madan et al. | 715/512 |
| 2005/0223315 A1 * | 10/2005 | Shimizu et al. | 715/512 |
| 2007/0027920 A1 | 2/2007 | Alvarado et al. | |
| 2007/0038438 A1 | 2/2007 | Cho et al. | |
| 2007/0083323 A1 | 4/2007 | Rosenberg | |
| 2007/0083806 A1 | 4/2007 | Boyles et al. | |
| 2008/0022195 A1 * | 1/2008 | Lyle et al. | 715/230 |
| 2008/0136833 A1 * | 6/2008 | Taniguchi et al. | 345/581 |
| 2008/0222552 A1 | 9/2008 | Batarseh et al. | |
| 2008/0228729 A1 * | 9/2008 | Frank et al. | 707/3 |
| 2008/0228754 A1 * | 9/2008 | Frank et al. | 707/5 |

FOREIGN PATENT DOCUMENTS

EP    1526463 A1    4/2005

OTHER PUBLICATIONS

Anonymous: "Learn more about Babel Fish", yahoo.com, Oct. 12, 2007, Retrieved from theInternet: URL:http://web.archive.org/web/20071012140211/http://babelfish.yahoo.com/help [retrieved on Aug. 23, 2010], all pages.
"Notizen", In: Dirk Louis, Oliiver Pott: "Outlook 2000—Intelligent organisieren, kommunizieren: planen", May 15, 2000, Markt und Technik, XP007914464, ISBN: 3827257611, pp. 586-598.
Patent Cooperation Treaty, International Search Report and Written Opinion of the International Searching Authority for International Application No. PCT/US2010/040131 (CS34690), Oct. 13, 2010, 17 pages.

* cited by examiner

*Primary Examiner* — Stephen Hong
*Assistant Examiner* — Gregory J Vaughn

(57) ABSTRACT

The invention provides embodiments of a method an apparatus for dynamic management of distributed context. Each of a plurality of sticky notes can be associated with contextual information corresponding to a first context in which the virtual sticky note was posted. A request to access at least one of the virtual sticky notes can be received. A second context in which the request was generated can be identified. At least one of the virtual sticky notes that is associated with contextual information that corresponds to the second context can be identified. The identified virtual sticky note(s) can be communicated for presentation to a user.

16 Claims, 9 Drawing Sheets

METHOD AND APPARATUS FOR DYNAMIC MANAGEMENT OF DISTRIBUTED CONTEXT

BACKGROUND OF THE INVENTION

1. Field of the Invention

The present invention generally relates to information systems and, more particularly, to management of content in an information system.

2. Background of the Invention

The use of sticky notes has been immensely popular since their inception in the 1970s, initially under the brand name Post-it®. A sticky note is a piece of stationery with a strip of reusable pressure sensitive adhesive on one side. Although the adhesive maintains permanent adhesion to the stationery, it enables the stationery to be temporary attached to other surfaces without leaving a noticeable amount of adhesive residue when the sticky note is removed. Sticky notes are commonly used on documents, walls, desks, and a myriad of other surfaces.

As with other types of office supplies in use prior to the digital revolution, the concept of sticky notes has been extended into the realm of digital information. Virtual sticky notes may be used to temporarily associate notes with various types of electronic media, for instance in text documents and on web pages. Oftentimes virtual sticky notes are configured to look reasonably similar to the original sticky notes when the virtual sticky notes are presented on a display. This provides a familiar means of indicating to the viewer that the content presented on the sticky note is not intended to be a permanent part of the underlying media.

SUMMARY OF THE INVENTION

The present invention relates to a method of managing a collection of virtual sticky notes. Each of a plurality of sticky notes can be associated with contextual information corresponding to a first context in which the virtual sticky note was posted. A request to access at least one of the virtual sticky notes can be received. A second context in which the request was generated can be identified. At least one of the virtual sticky notes that is associated with contextual information that corresponds to the second context can be identified. The identified virtual sticky note(s) can be communicated for presentation to a user.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the management of a collection of virtual sticky notes, including both virtual sticky note content and related contextual information, which may include metadata. The content and contextual information is managed in a way that increases the value of the virtual sticky note content to particular users, and simplifies the task of searching for relevant content, as well as tasks of reusing, updating and sharing content.

Figure 1:
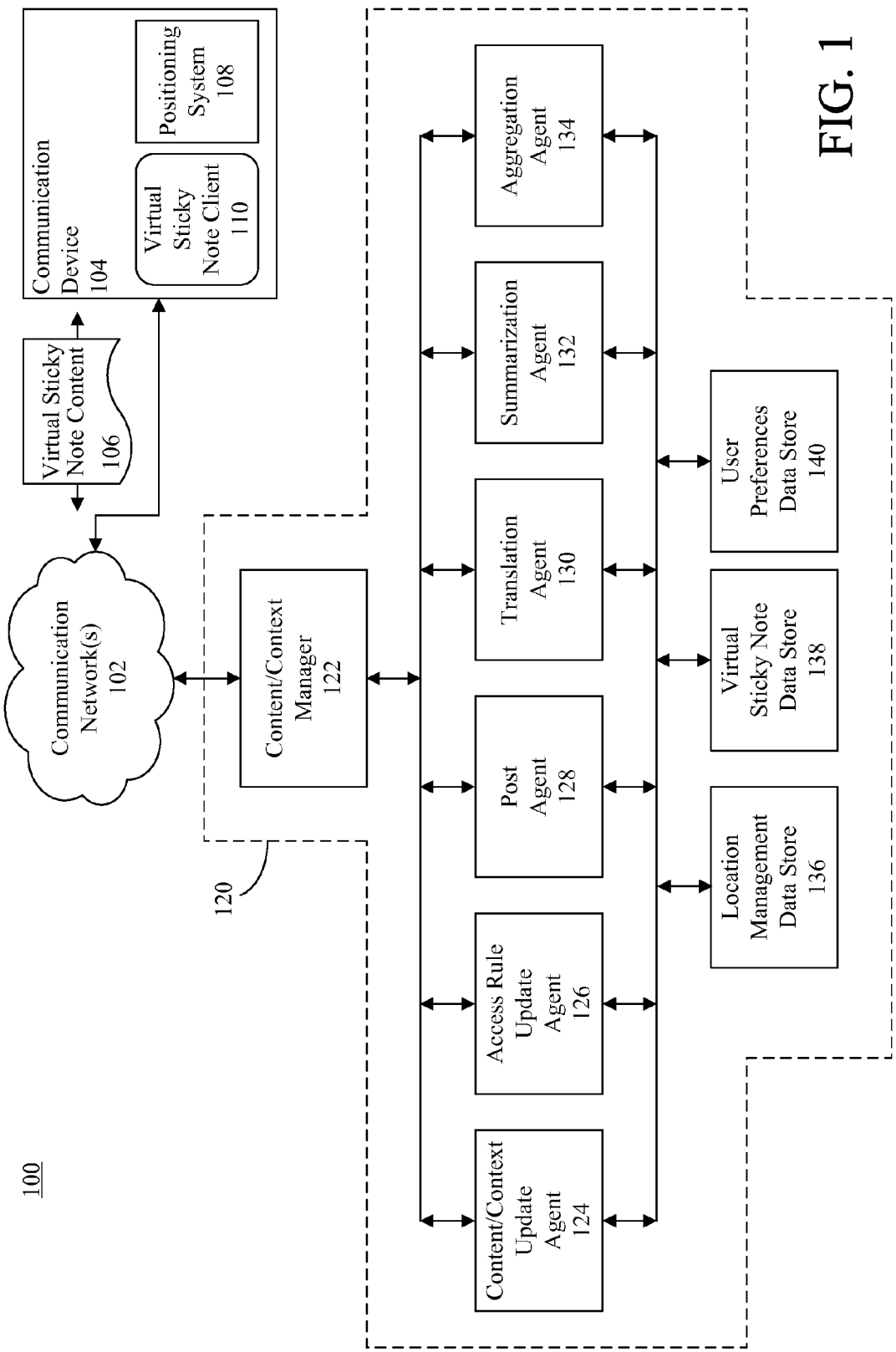
FIG. 1 depicts a communication system that manages a collection of virtual sticky notes, which is useful for understanding the present invention.

FIG. 1 depicts a communication system 100 that is useful for understanding the present invention. The communication system can include one or more communication networks 102 that communicatively link a communication device 104 to a virtual sticky note management system (hereinafter "management system) 120 in a computer (not shown).

The communication network(s) 102 can implement any network architecture suitable for wired and/or wireless communication. For example, the communication network(s) 102 can include network servers, routers, switches, access points, base transceiver stations, base station controllers, and so on. In this regard, the communication network(s) 102 can implement any of a variety of wired and/or wireless communication protocols that are suitable for supporting communications between the communication device 104 and the management system 120. Examples of such protocols include, but are not limited to, Internet Protocol (IP), IEEE 802 communication protocols (e.g., 8021.11, 802.16, etc.), EUTRAN, UMB, WPA, WPA2, GSM, UMTS, TDMA, CDMA, WCDMA, OFDM, LTE, direct wireless communication, and so on.

The communication device 104 can be any electronic device that is suitably configured to communicate with the management system 120 and that can send and/or receive virtual sticky note content 106 to/from the management system 120. Examples of the communication device 104 include, but are not limited to, a computer, a mobile computer, a personal digital assistant, a telephone, a mobile telephone, a mobile radio, and the like. Moreover, the communication device 104 can be configured to present virtual sticky notes to a user and receive user inputs.

As used herein, a user is a human being that receives information from a communication device, such as the communication device 104. A user also may respond to prompts presented on the communication device. The user can receive the information via a display, an audio transducer, a haptic device, or via any other suitable component or components that present information in a manner that is suitable for human perception. Further, a user may enter user inputs via a tactile device (e.g., a button, a key, a soft key, a sensor, etc.).

The communication device 104 can include a positioning system 108 that determines a position of the communication device 104. In one arrangement, the positioning system 108 can include a global positioning system (GPS) which includes a GPS receiver which processes GPS signals to determine the location of the communication device 104. In another arrangement, the positioning system 108 can include a local positioning system which determines the position of the communication device 104 based on the proximity of one or more access points, base station transceivers, transponders, or the like. Both GPSs and local positioning systems are known to those skilled in the art.

The sticky note content 106 can be exchanged between the communication device 104 and the management system 120 using a virtual sticky note client 110. In one arrangement, the virtual sticky note client 110 can be instantiated on the communication device 104. In another arrangement, the virtual sticky note client 110 can be instantiated on a system to which the communication device 104 is communicatively linked. The communication device 104 can be communicatively linked to such a system via the communication network(s) 102, a personal area network, for example BlueTooth®, ZigBee®, or a personal area network implemented in accordance with any other suitable protocols.

The virtual sticky note client 110 can be implemented as an application stored on a computer-usable medium. Examples of a computer-usable medium include, but are not limited to, an electronic storage device (e.g., random access memory, read-only memory, flash memory, and the like), a magnetic storage medium (e.g., a hard disk drive, a data storage tape, and the like), an optical storage medium (e.g., a compact disc, a digital versatile disk, and the like), a magneto-optical storage medium, or any other apparatus on which computer-usable program code may be stored and accessed by the communication device when executed.

The sticky note content 106 can be presented to a user as media (e.g., text, symbols, video, etc.) via a display that is incorporated into the communication device 104, or on a display that is communicatively linked to the communication device 104. The sticky note content 106 can be presented as media presented via an audio transducer and/or haptic device, for instance as audio information and/or tactile information (e.g., Braille). In this regard, one or more suitable audio transducers and/or haptic devices also can be incorporated into the communication device 104 or otherwise can be communicatively linked to the communication device.

The management system 120 can automatically implement processes which it performs. Such processes will be described herein. The management system 120 can include a content/context manager 122 and one or more agents 124, 126, 128, 130, 132, 134. The content/context manager 122 and agent(s) 124-134 also may be implemented as applications stored on a computer-usable medium. In illustration, the management system 120 can include a content/context update agent 124 that updates virtual sticky note content and/or context, an access rule update agent 126 that updates access rules, a post agent 128 that reposts virtual sticky note content and/or context, a translation agent 130 that translates virtual sticky note content and/or context into one or more languages, a summarization agent 132 that summarizes virtual sticky note content and/or context, and an aggregation agent 134 that aggregates virtual sticky note content and/or context.

The operations performed by the various agents 124-134 will be described herein in greater detail. Notwithstanding, those skilled in the art will understand that such operations can be performed by one or more agents, and that the operations can be distributed among any number of agents in a suitable manner. Moreover, one or more of these operations may be performed by the content/context manager 122. Thus, the present invention is not limited to these specific examples.

In addition, the management system 120 can include one or more data stores 136, 138, 140 in which various types of data are stored on one or more computer-usable media. The data store(s) 136-140 can include one or more digital data files, text files, databases, or any other computer-usable data storage objects from which computer-usable data may be retrieved from the computer-usable medium(s). The data store(s) 136-140 further may include one or more applications (e.g., database(s)) which, in response to requests from the agent(s) 124-134 and/or the content/context manager 122, retrieve data from the computer-usable medium(s) and communicate the data to an appropriate agent 124-134 or other application. The applications also store to the computer-usable medium(s) data received from the agent(s) 124-134. By way of example, the management system 120 can include a data store 136 for location management data, a data store 138 for virtual sticky note data, and a data store 140 for user preferences. The location management data can include information related to various entities based on their respective locations. The sticky note data can include virtual sticky note content, context associated with the virtual sticky note content, and preference data associated with the virtual sticky notes for example rules and/or access rules. The access rules can include rules pertaining to which users are granted permissions to access and/or update the virtual sticky note content. In another arrangement, the access rules can include rules pertaining to digital rights management. The user preferences can include preference data for various users of the management system 120.

As used herein, a virtual sticky note is computer-usable data that contains virtual sticky note content pertaining to information that may be of interest to a user and which is accessible via a suitable communication device, such as the communication device 104. For example, the virtual sticky note content can include informational content pertaining to one or more subjects of user interest, for instance a review of a restaurant, information about menu items offered by the restaurant, a review of a theatrical production or movie, a review of an amusement park, a review of an aquarium, a zoo or a museum, a review of attractions at such locations, a review of a store, information about items sold by the store, information about store employees, and so on. The virtual sticky note content also may include notes shared among a limited group of authorized users, for instance a shopping list, a reminder, etc. Nonetheless, any other type of informational content may be provided as virtual sticky note content, and the invention is not limited to these examples.

As used herein, virtual sticky note context is contextual information that describes the virtual sticky note content contained in a virtual sticky note. The contextual information can include, for example, information related to terms used in the virtual sticky note content. The contextual information also can include an identifier that identifies a name of an entity (e.g., a restaurant, a store, a zoo, an aquarium, an amusement park, etc.), location information that identifies the location of the entity and/or locations of other related entities, information about a user who posted the virtual sticky note, information about when the sticky note was posted (e.g., a year, a month, a week, a day, a time of day, etc.). The contextual information also may include information relating to the summary reduction rate of the content of the virtual sticky note (which will be described herein), information about a language in which the virtual sticky note content was posted, information pertaining to the amount of user access to the virtual sticky notes (e.g., access patterns, frequency of access, interest clusters, etc.), information that associates the virtual sticky notes with other data or files, and so on. For brevity, hereinafter "virtual sticky note content" may be referred to simply by the term "content," and "virtual sticky note context" may be referred to by the term "context."

Referring again to the management system 120, the content/context manager 122, the agent(s) 124-134 and the data stores 136-140 can be instantiated on a single device, such as a server or other processing device, or distributed among a plurality of devices that are communicatively linked. Similarly, the location management data store 136, virtual sticky note data store 138 and user preferences data store 140 can be implemented as a single data store or using a plurality of data stores. Moreover, any of the individual data stores 136-140 can be distributed among multiple data stores. Accordingly, the configuration of the data stores 136-140 presented herein will be understood by those skilled in the art as representing examples of the inventive arrangements, and that the present invention is not limited to these particular examples.

In illustration, the content/context manager 122 and agent(s) 124-134 can be instantiated on a first device, and the data store(s) 136-140 can be instantiated on one or more other devices that are communicatively linked to the first device via a communication network, such as a wide area network (e.g., the communication network(s) 102 or a local area network). Operation of the management system 120 may be understood by referring to the examples presented in the following signal flow diagrams.

Figure 2:
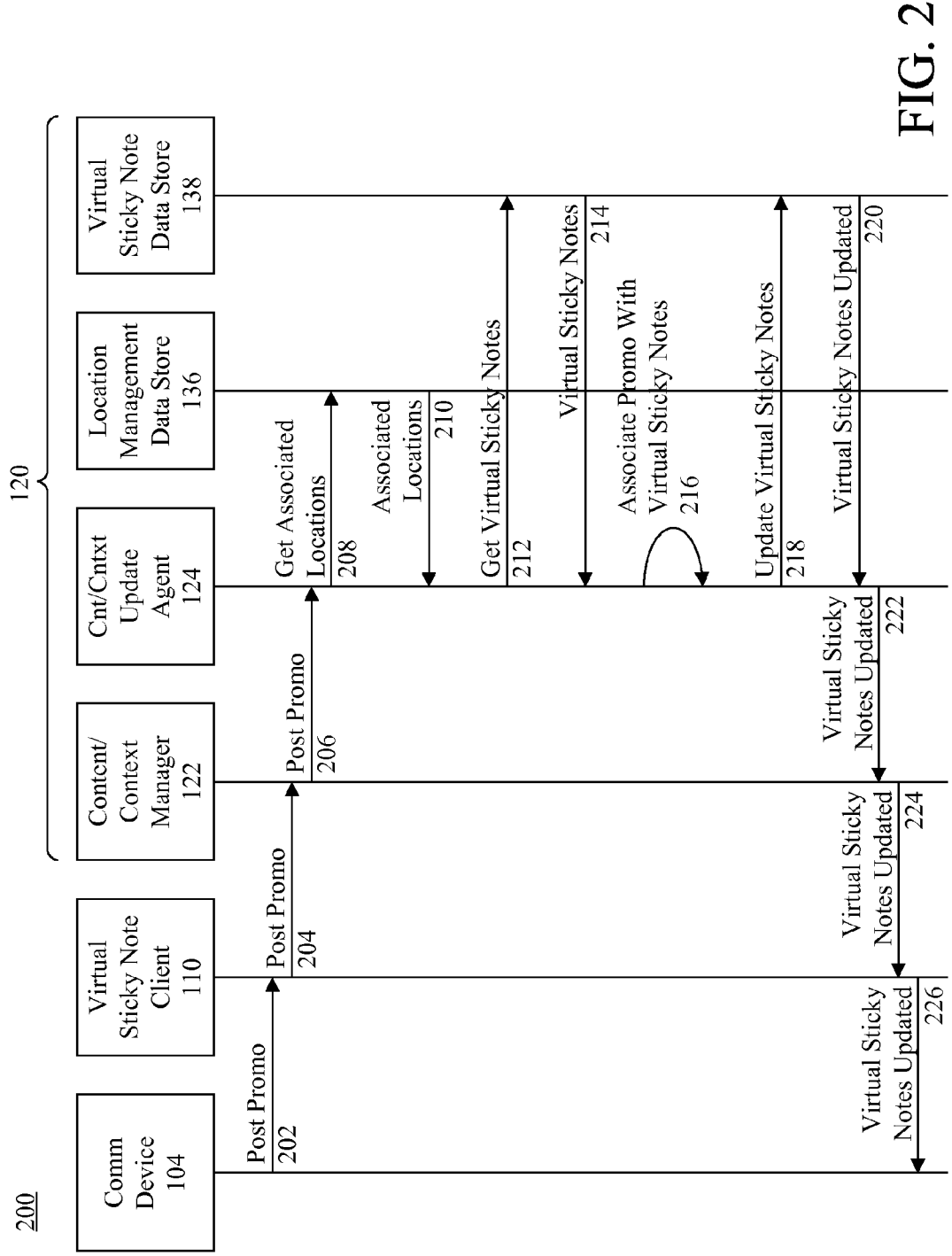
FIGS. 2-9 depict various signal flow diagrams presenting methods of managing a collection of virtual sticky notes that are useful for understanding the present invention.

FIG. 2 depicts a signal flow diagram that is useful for understanding a method 200 in which the management system 120 may be used to post and/or update promotional information that is to be made available to a user of the communication device 104. At step 202, a request to post promotional information can be received by a communication device 104, for instance in response to a user input received by the communication device 104, and communicated to the virtual sticky note client 110. The user input can be received, for example, from an authorized user who is a manager or another person authorized to post promotional information about a particular entity. The promotional information can, for example, include information about menu items in a restaurant, information about exhibits or attractions at a specific location, information about coupons, special pricing, sales events, or any other promotional information. At step 204, the virtual sticky note client 110 can communicate the request to the content/context manager 122, which at step 206 can forward the request to a suitable agent, for instance the content/context update agent 124.

At step 208, the content/context update agent 124 can communicate a message to the location management data store 136 to request location information for one or more entities that are associated with the user. For example, if the user is a manager responsible for restaurants in a particular region, identifiers for the individual restaurants can be requested. The identifiers can identify the restaurants based on their geographic locations, assigned alphanumeric characters, or can identify the restaurants in any other suitable manner. In response, at step 210, the location management data store 136 can retrieve the location information for the entity or entities associated with the user and communicate the location information to the content/context update agent 124.

At step 212, the content/context update agent 124 can process the location information and communicate a request to the virtual sticky note data store 138 requesting virtual sticky notes associated with the entities identified by the location information. In response, at step 214, the virtual sticky note data store 138 can retrieve the virtual sticky note data associated with the identified entities and communicate the virtual sticky notes to the content/context update agent 124.

At step 216, the content/context update agent 124 can associate the promotional information with virtual sticky notes that correspond to the respective entities. For example, the promotional information can be associated with virtual sticky notes for each of the restaurants associated with the user.

Accordingly, each time virtual sticky notes for the entities are presented to other users (e.g., consumers), the promotional information can be presented to those users. For instance, the promotional information can be presented within the virtual sticky notes, presented on the same display as the virtual sticky notes, presented before the virtual sticky notes are presented, or presented after the virtual sticky notes. Thus, the management system 120 can be used by businesses and other entities to market promotional information to virtual sticky note users.

At step 218, the content/context update agent 124 can communicate a message to the virtual sticky note data store 138 requesting an update to the virtual sticky notes to indicate the associations generated in step 216. For instance, the content/context update agent 124 can communicate updated virtual sticky notes which include the promotional information. In another arrangement, the content/context update agent 124 can communicate new context data to be associated with the virtual sticky notes that indicate the associations with the promotional information. When a virtual sticky note is presented, the associated context can be processed to trigger the presentation of the promotional information, which will be described herein in further detail. If the promotional information is to be included in the virtual sticky notes, the virtual sticky note data store 138 can update the content of those virtual sticky notes. If, however, the promotional information is not included in the virtual sticky notes, but is otherwise associated with the virtual sticky notes, the virtual sticky note data store 138 can update the context associated with the virtual sticky notes.

Referring to step 220, in response to updating the virtual sticky notes, the virtual sticky note data store 138 can communicate a message to the content/context update agent 124 indicating that the virtual sticky notes have been updated. At step 222, the content/context update agent 124 can communicate the message to the content/context manager 122, which at step 224 can communicate the message to the virtual sticky note client 110. At step 226 the virtual sticky note client 110 can present a message on the communication device 104 to indicate to the user that the virtual sticky notes have been updated. In another arrangement, in lieu of communicating the messages in steps 220-226, the updates to the virtual sticky notes can be indicated after additional updates to the virtual sticky note data are performed (e.g., at step 248 of FIG. 3), and each of the updates that were performed can be indicated simultaneously.

Figure 3:
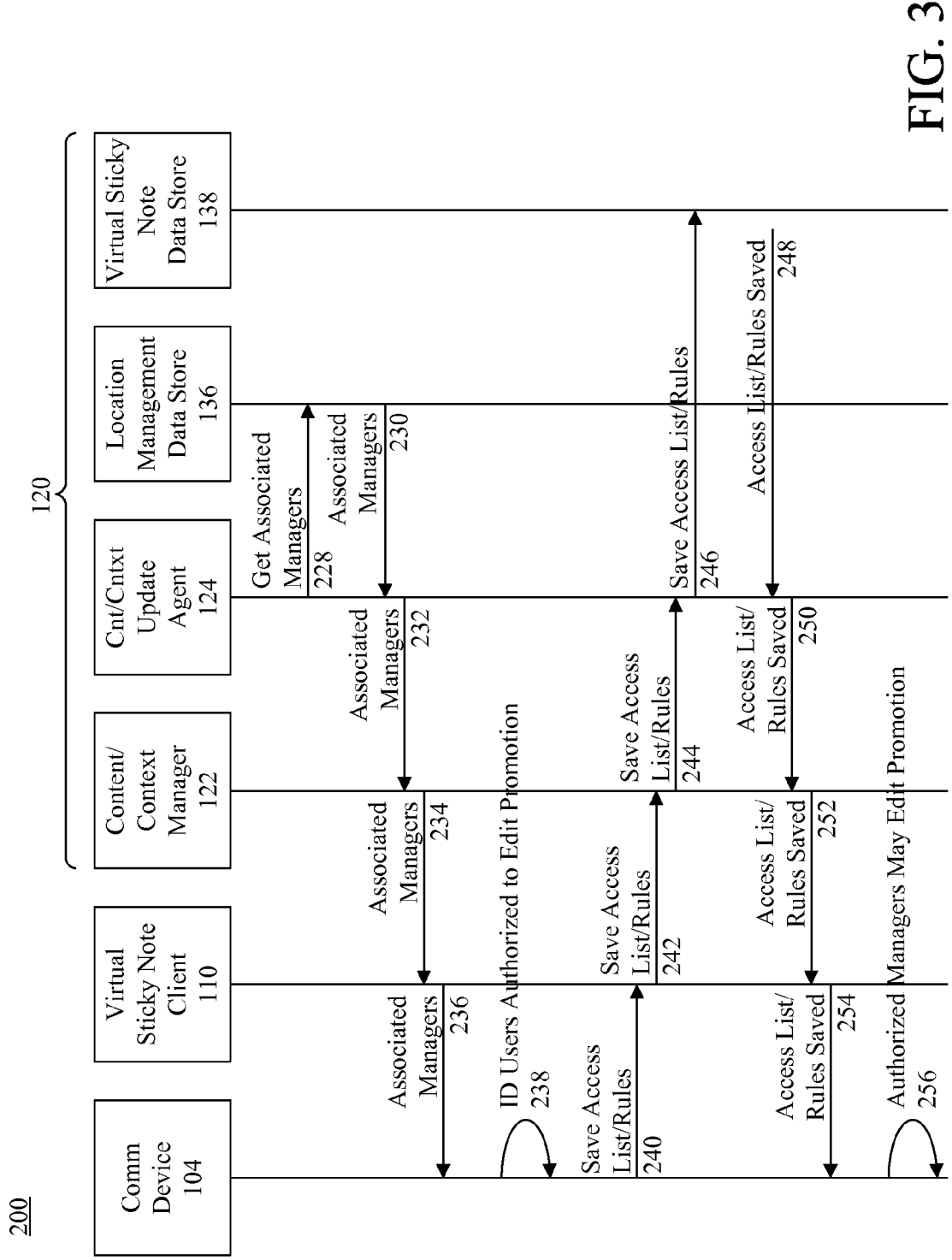

FIG. 3 depicts a continuation of the method 200 presented in FIG. 2. At step 228 the content/context update agent 124 can communicate a message to the location management data store 136 requesting an identification of managers or other authorized users (hereinafter collectively referred to as "managers") associated with each of the entities identified at step 210. At step 230 the location management data store 136 can retrieve identifiers for the managers and communicate the identifiers to the content/context update agent 124. In response to the request, at step 232, the content/context update agent 124 can communicate the identifiers to the content/context manager 122 which, at step 234, can communicate the identifiers to the virtual sticky note client 110. At step 236 the virtual sticky note client 110 can present the identifiers for the associated managers on the communication device 104, for example as hyperlinks or in another suitable manner.

At step 238 the communication device 104 can receive a user selection of those managers that are authorized to access the promotional information, for instance for editing purposes. The user also can specify rules applicable to such manager access, for instance by selecting rules from a menu of rule options. Such rules can define required conditions that must be met in order to access and/or change the promotional information, for example, when the rules can be edited, eligible promotional items, minimum and maximum values of promotions, and the like.

At step 240, in response to the user saving the selections via the communication device 104, an access list identifying the selected managers and applicable rules can be generated by the virtual sticky note client 110. At step 242 the virtual sticky note client 110 can communicate to the content/context manager 122 a message that includes the access list/rules and can request that the access list/rules be saved. At step 244 the content/context manager 122 can communicate the message to the content/context update agent 124. In another arrangement, the content/context manager 122 can communicate the access list/rules to the access rule update agent 126 (not shown in FIG. 3).

At step 246 the content/context update agent 124 (or access rule update agent 126) can communicate a message to the virtual sticky note data store 138 requesting that the access list/rules be associated with the promotional information, as well as the associated virtual sticky notes. Responsive to the message, the virtual sticky note data store 138 can store the access list/rules to a suitable computer-usable medium in a manner which associates the access list/rules with the promotional information and the associated virtual sticky notes.

At step 248, the virtual sticky note data store 138 can communicate a message to the content/context update agent 124 (or the access rule update agent 126) indicating that the access list/rules have been saved. At step 250, the content/context update agent 124 (or the access rule update agent 126) can communicate the message to the content/context manager 122 which, at step 252, can communicate the message to the virtual sticky note client 110. At step 254, the virtual sticky note client 110 can present a corresponding message via the communication device 104 indicating to the user that the access list/rules have been saved.

Referring to step 256, the authorized managers may edit the promotional information in accordance with the rules that are established. For example, steps 202-254 can be repeated for editing existing promotional information in lieu of posting new promotional information. Such a process can be implemented in accordance with the applicable rules. Accordingly, if certain changes are not allowed by the rules, such as changes to the authorized managers, changes to the rules, etc., then the steps that are associated with those changes need not be performed.

Figure 4:
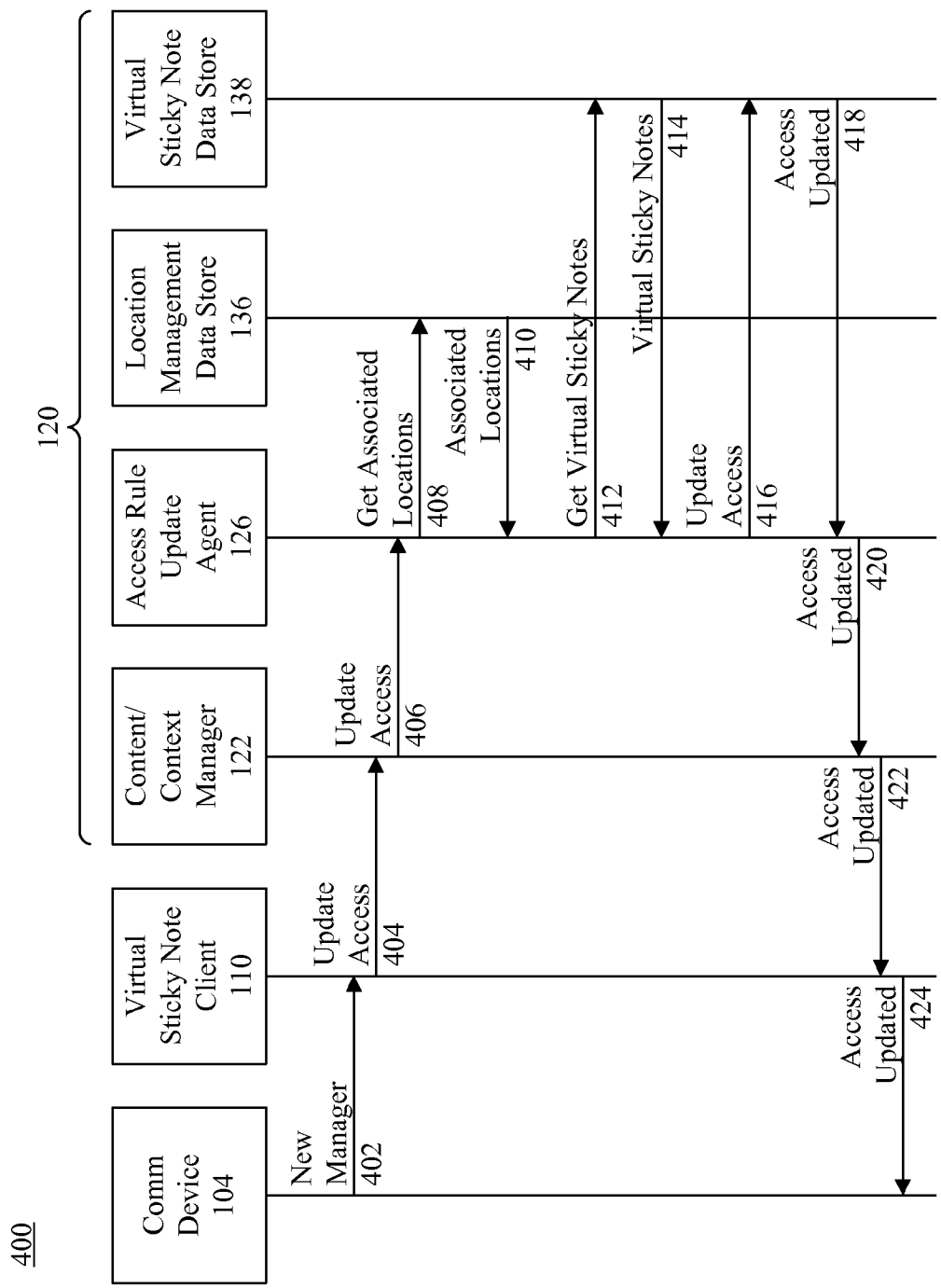

FIG. 4 depicts a signal flow diagram that is useful for understanding a method 400 in which the management system 120 may be used to provide a new manager or other authorized user access to add and/or edit promotional information. At step 402, a user who is authorized to manage such data can enter a request to add a new manager, as well as a new manager identifier, via the communication device 104, which can pass the new manager request and identifier to the virtual sticky note client 110. The virtual sticky note client can communicate a corresponding request to the content/context manager 122 which, at step 406, can communicate the request to the access rule update agent 126.

In response, at step 408 the access rule update agent 126 can communicate a message to the location management data store 136 to request location information for one or more entities that are associated with the user, for example as previously described for step 208 of FIG. 2. In response, at step 410, the location management data store 136 can retrieve the location information for the entity or entities associated with the user and communicate the location information to the access rule update agent 126.

At step 412, the access rule update agent 126 can process the location information and communicate a message to the virtual sticky note data store 138 requesting virtual sticky notes associated with the entities identified by the location information. In response, at step 414, the virtual sticky note data store 138 can retrieve the virtual sticky note data associated with the identified entities and communicate the virtual sticky notes to the access rule update agent 126.

At step 416, the access rule update agent 126 can communicate a message to the virtual sticky note data store 138 requesting an update to the content preferences for the corresponding virtual sticky notes to authorize the new manager access to the associated promotional information and/or the respective virtual sticky notes. The message also can indicate the identifier for the new manager. In response, the virtual sticky note data store 138 can update the access list/rules for the virtual sticky notes, as well as associated promotional information, with the new manager identifier. Accordingly, the new manager will be authorized to edit and update the promotional information.

At step 418, the virtual sticky note data store 138 can communicate a message to the access rule update agent 126 that the access rules have been updated. At step 420, a message indicating that the access rules have been updated can be propagated from the access rule update agent 126 to the content/context manager 122 which, at step 422 can communicate the message to the virtual sticky note client 110. At step 424, via the communication device 104, the virtual sticky note client 110 can present a message indicating the access rules have been updated.

In another aspect of the inventive arrangements, the access rule update agent 126 can automatically update access rules for the virtual sticky notes. For example, the access rule update agent 126 can periodically compare the access rules to the user profiles of users authorized to access the virtual sticky notes. If information about an authorized user or a group of users changes or evolves, the access rule update agent 126 can automatically extrapolate new access rules based on existing access rules and the changes or evolution of the user(s). The extrapolation may be performed by identifying equivalent, though not necessarily identical, contexts. A dictionary of contextual information can be accessed to facilitate the process of identifying the equivalent context. The access rule update agent 126 then can associate the updated access rules with the virtual sticky note.

Figure 5:
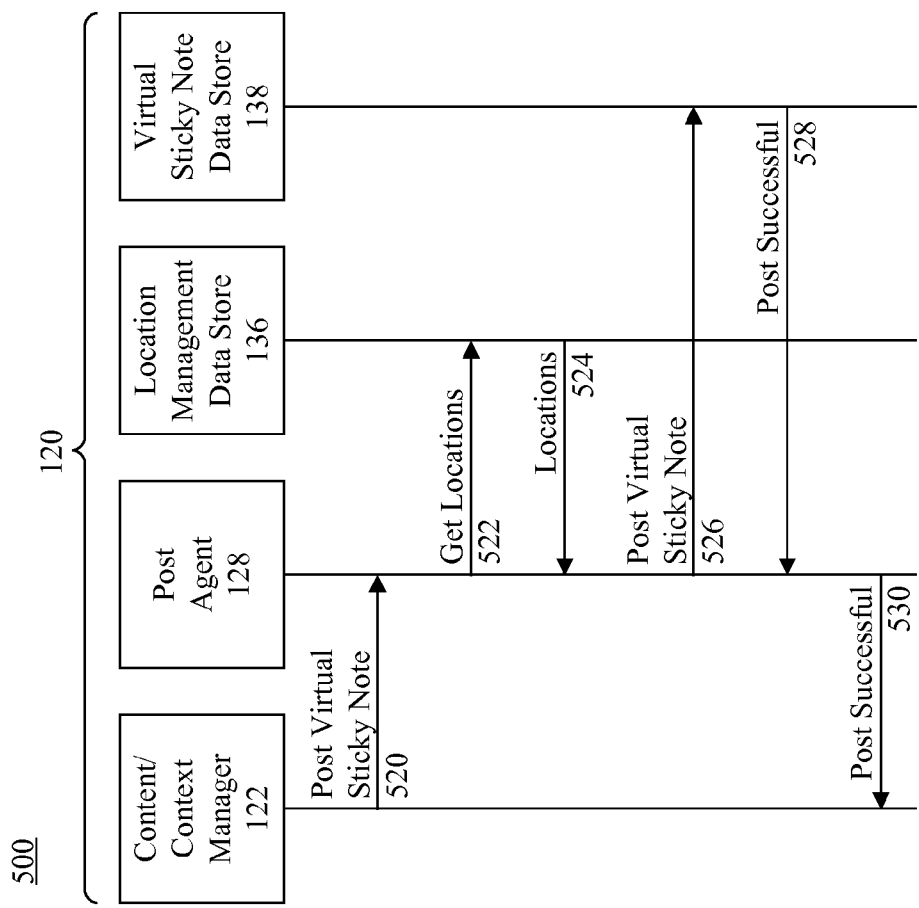

FIG. 5 depicts a signal flow diagram that is useful for understanding a method 500 in which the management system 120 may be used to post a virtual sticky note. At step 502 the virtual sticky note client 110 can receive from a user a virtual sticky note entered via the communication device 104. At step 504 the virtual sticky note client 110 can determine the context in which the virtual sticky note is being posted and generate corresponding contextual information.

For example, the contextual information can include information related to the time, date and/or day of the week the virtual sticky note was entered into the communication device, an entity that is the subject of the virtual sticky note, or the like. The virtual sticky note client 110 can interface with the positioning system of the communication device 104 to determine a present location of the communication device. Based on the location, the virtual sticky note client 110 can identify an entity with which the virtual sticky note is to be associated. In another arrangement, the user can identify the entity. Other contextual information also can be generated, for instance weather conditions at the time and location in which the virtual sticky note is entered into the communication device 104, traffic conditions at such time and place, etc.

If the context of the virtual sticky note is related to an entity at a particular location, at step 504 the virtual sticky note client 110 can prompt the user to indicate whether to associate the virtual sticky note only with that entity, or with that entity and other related entities. In illustration, the virtual sticky note client can interface with the positioning system of the communication device, and any other suitable data sources, to identify the entity based on user inputs and/or the present location of the communication device 104.

For instance, if the communication device 104 is presently located in, or near, a particular restaurant, and the user inputs or selects the name of the restaurant, the virtual sticky note client 110 can identify the restaurant. Moreover, some restaurants are members of restaurant chains which have restaurants in multiple locations. Thus, the user can be prompted to select only the restaurant most proximately located, that restaurant and other related restaurants located in a particular geographic region, or that restaurant and all related restaurants.

In another arrangement, the user can be prompted to identify the specific entities with which to associate the virtual sticky note. For instance, the virtual sticky note client 110 can present a list of entities from which the user can select entities with which to associate the virtual sticky note. In yet another arrangement, the user can be prompted to enter an address, a name and city, geographical coordinates, or any other information which may be suitable for identifying the entity or entities with which to associate the virtual sticky note. At step 506, a user response can be received identifying the entity or entities with which to associate the virtual sticky note.

Virtual sticky notes may, in some circumstances, be applicable for a finite period of time, or lose importance as time passes. Thus, summaries of virtual sticky notes may be used as a means of reducing over time the amount of content within a virtual sticky that is presented to other users. Accordingly, at step 508, the virtual sticky note client 110 can prompt the user to enter or select a summary reduction rate. As used herein, a summary rate indicates a frequency at which the contents of a virtual sticky note are further summarized over time.

By way of example, a user can select a summary reduction rate of three (3) days. In this case, when another user accesses the virtual sticky note, the entire sticky note can be presented for the three day period following the initial posting. However, after three days, in accordance with the summary reduction rate, the contents of the virtual sticky note can be summarized for initial presentation to other users. Moreover, the contents of the virtual sticky note for initial presentation subsequently can be further summarized every three days. Notwithstanding, if a user to whom a summarized virtual sticky note is presented selects to have the entire virtual sticky note presented, the entire virtual sticky note can be presented accordingly. In another embodiment, the summary reduction rate may further indicate the desired degree of content reduction, e.g., reduce words by 20%, when the content is summarized. Summarization and frequency of summarization of the virtual sticky notes can be implemented by the summarization agent 132 (not shown in FIG. 5), as will be described herein.

At step 510, a user input or selection of a summary reduction rate can be received by the virtual sticky note client 110. The sticky note client can include the summary reduction rate in the contextual information associated with the virtual sticky note. At step 512, the virtual sticky note client 110 can communicate a message to the content/context manager 122 requesting that the virtual sticky note be posted. The message can include the contents of the virtual sticky note, as well as the related contextual information. The contextual information can identify, among other things, one or more entities with which the virtual sticky note is associated.

In an arrangement in which the user wishes to have access rules associated with the virtual sticky note, for example to indicate that the virtual sticky note is to be accessed only by certain users, the method 200 presented in FIG. 3 can be applied to the virtual sticky note (in lieu of the promotional information) to associate those users with the virtual sticky note. Further, the method 400 presented in FIG. 4 can be implemented to associate additional authorized users with the virtual sticky note. In the present example, the term "manager" would mean an authorized user.

Figure 6:
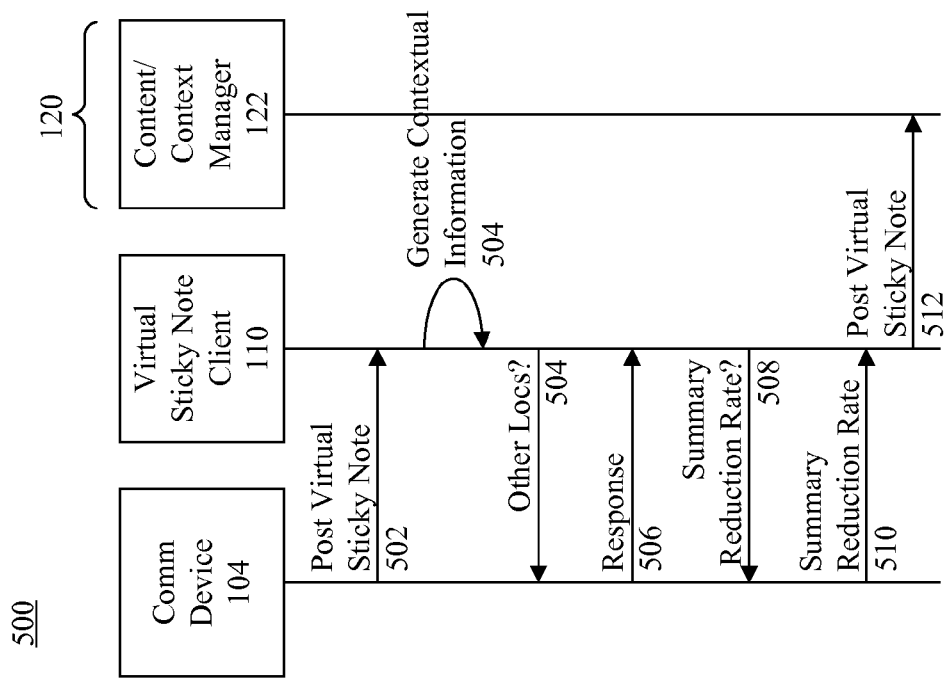

FIG. 6 depicts a continuation of the method 500 presented in FIG. 5. At step 520 the content/context manager 122 can communicate to the post agent 128 the message requesting that the virtual sticky note be posted. At step 522, the post agent 128 can communicate a message to the location management data store 136 requesting the locations of the entities identified by the message requesting that the virtual sticky note be posted. In response to the request, at step 524 the location management data store 136 can retrieve and communicate to the post agent 128 a message containing the identifiers for the entities indicated in the request.

At step 526, the post agent 128 can communicate a message to the virtual sticky note data store 138 which requests that the virtual sticky note be posted. In response, the virtual sticky note data store 138 can save the virtual sticky note data (e.g., content and contextual information) to a suitable computer-usable medium in a manner which allows the virtual sticky note data, and summaries of the virtual sticky note content, to be accessed by other users.

At step 528, the virtual sticky note data store 138 can communicate a message to the post agent 128 indicating that the virtual sticky note has been posted. At step 530, the post agent 128 can communicate to the content/context manager 122 a message indicating that the post of the virtual sticky note was successful.

In one aspect of the inventive arrangements, the virtual sticky note can be configured to be updated via a really simple syndication (RSS) feed. For example, when posting the virtual sticky note, the user can select a RSS feed to associate with the virtual sticky note. Such RSS feed can be indicated within the context or within the content of the virtual sticky note. To trigger an update, a user can update an associated RSS document, and such document can be communicated to the content/context update agent 124. The content/context update agent 124 can compare the content of the RSS document to the content of the virtual sticky note, and update the virtual sticky note content to match the RSS document. The use of RSS feeds is well known to the skilled artisan.

Figure 7:
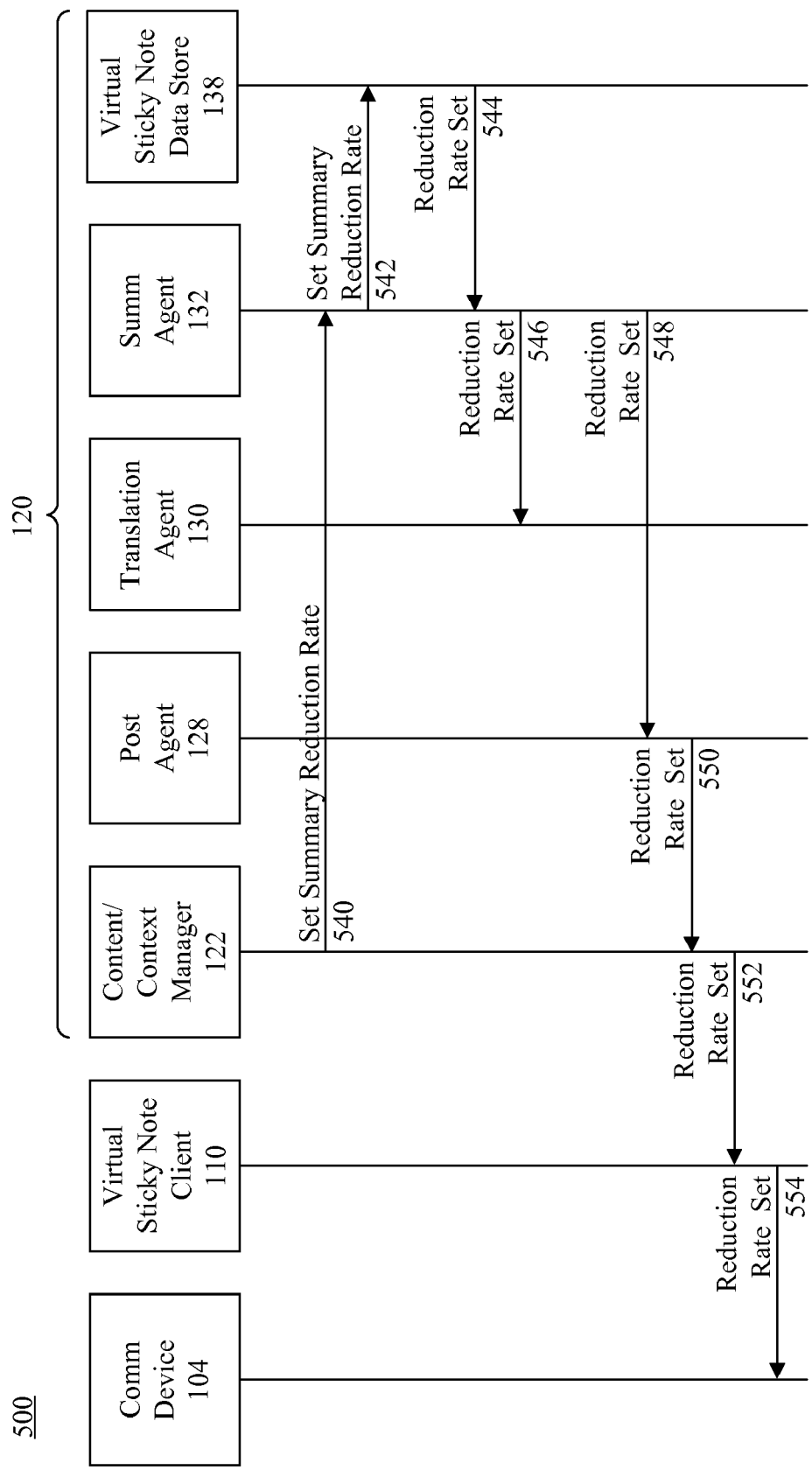

FIG. 7 depicts a continuation of the method 500 presented in FIGS. 5 and 6. At step 540, the content/context manager 122 can communicate a message to the summarization agent 132 indicating a summary reduction rate to apply to the virtual sticky note. At step 542, the summarization agent 132 can communicate a message to the virtual sticky note data store 138 indicating to the virtual sticky note data store 138 to set the summary reduction rate.

In response to the message, the virtual sticky note data store 138 can associate the summary reduction rate with the virtual sticky note and, at step 544, communicate a message to the summarization agent 132 indicating the summary reduction rate has been set. At step 546, the summarization agent 132 can communicate to the translation agent 130 a message indicating that the summary reduction rate has been set. Similarly, at step 548, the summarization agent 132 can communicate to the post agent 128 a message indicating that the summary reduction rate has been set. At step 550, the post agent 128 can communicate to the content/context manager 122 the message indicating that the summary reduction rate has been set. Further, the content/context manager 122 can communicate the message to the virtual sticky note client 110 which, at step 554, can present the message to the user via the communication device 104.

Figure 8:
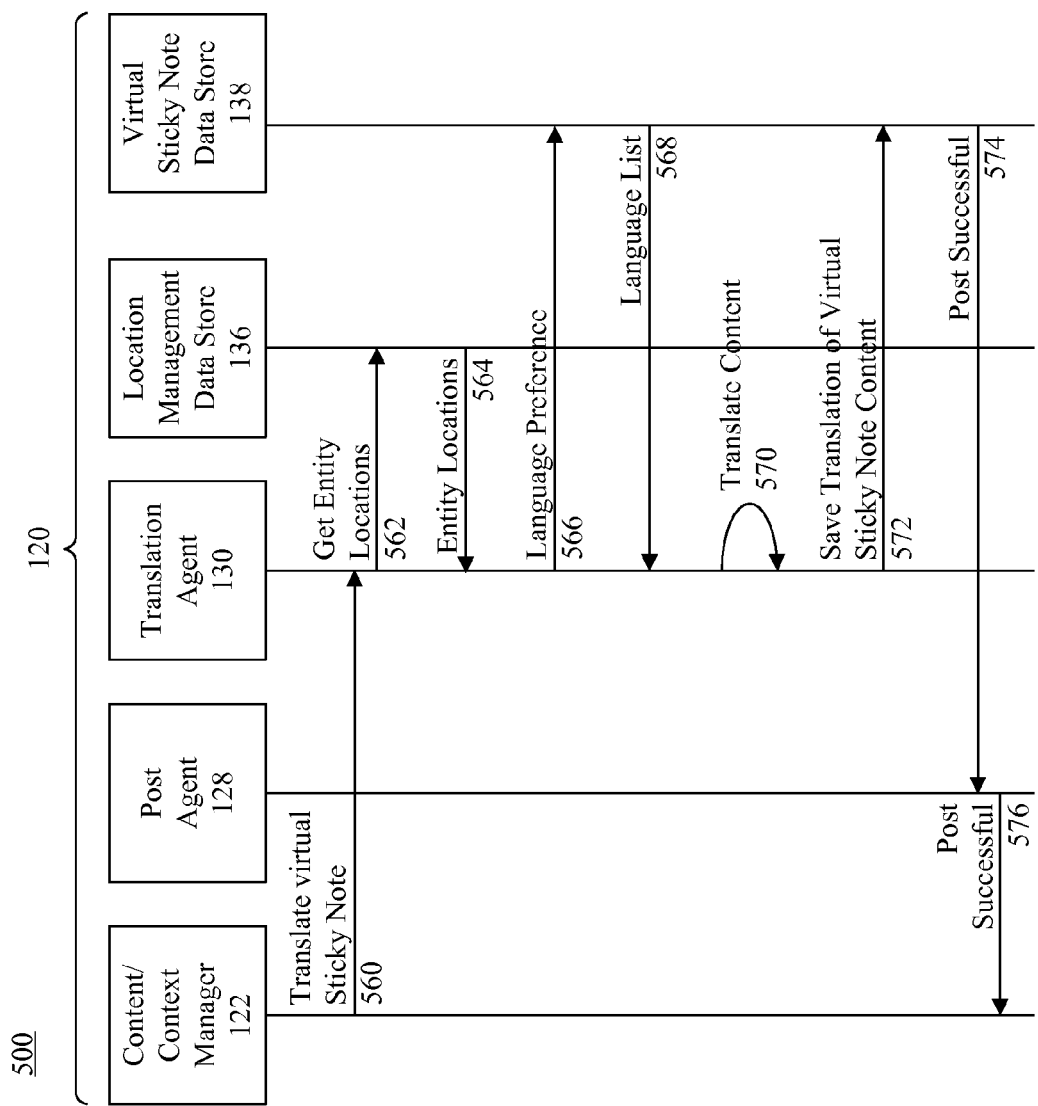

FIG. 8 depicts a continuation of the method 500 presented in FIGS. 5, 6 and 7. At step 560 the content/context manager 122 can communicate a message to the translation agent 130 requesting the translation agent to translate the content of the virtual sticky note into one or more other languages. This message also can include the content of the virtual sticky note, as well as the entities with which the virtual sticky note is associated.

At step 562, the translation agent 130 can communicate a message to the location management data store 136 requesting the geographic locations of the entities identified in the message received from the content/context manager 122 in step 520 of FIG. 6. At step 564, the location management data store 136 can communicate to the translation agent 130 the geographic locations of the identified entities.

At step 566, the translation agent 130 can communicate a message to the virtual sticky note data store 138 a message requesting a language preference for the respective geographic locations of the identified entities. At step 568, the virtual sticky note data store 138 can communicate to the translation agent 130 indicators of the requested language preferences.

At step 570, the translation agent 130 can translate the content of the virtual sticky note into one or more languages. For example, the translation agent 130 can translate the content into language preference(s) for each of the respective geographic locations of the identified entities. In some instances, a particular geographic location may have more than one language preference. For instance, if a particular entity is located in which a single language is primarily spoken, and that language differs from the language in which the virtual sticky note is posted, the content of the virtual sticky note can be translated into the language of the neighborhood. If, however, the particular entity is located in a neighborhood in which several languages are commonly spoken, the content of the virtual sticky note can be translated into each of the commonly spoken languages that differ from the language in which the virtual sticky note is posted.

Further, the translation agent 130 can translate summaries of the virtual sticky note content in accordance with any applicable summary reduction rates. In one arrangement, the translation agent 130 can translate summaries that are anticipated to be generated. In another arrangement, each time a virtual sticky note is summarized, the summary can be communicated from the summarization agent 132 (not shown) to the translation agent 130 and, in response, the translation agent 130 can translate the summary into the appropriate languages. The translations of the summaries then can be propagated to the virtual sticky note data store 138 in a suitable manner.

At step 572, the translation agent 130 can communicate a message to the virtual sticky note data store 138 requesting that the translation(s) of the virtual sticky note content be saved. The message can include such translations of the virtual sticky note content and an identifier that indicates the original sticky note. In response, the virtual sticky note data store 138 can store to a suitable computer-usable medium the respective translations; and associate the translations with the virtual sticky note.

At step 574, the virtual sticky note data store 138 can communicate a message to the post agent 128 indicating that the virtual sticky note, as well as the respective translations, has been saved. At step 576, the post agent 128 can communicate a message to the content/context manager 122 indicating that the virtual sticky note and the respective translations have been saved.

Figure 9:
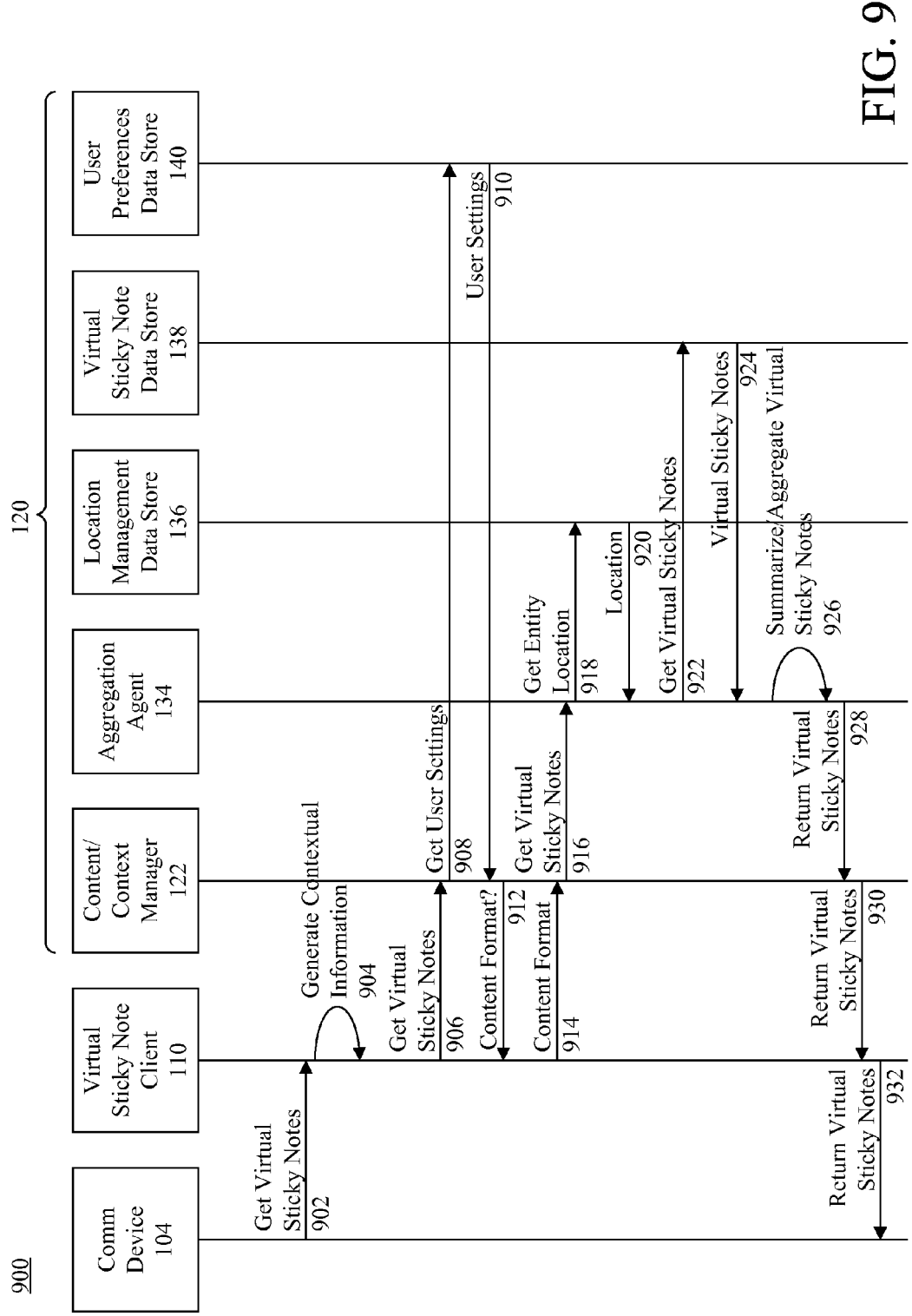

FIG. 9 depicts a signal flow diagram that is useful for understanding a method 900 in which the management system 120 may be used to display virtual sticky notes on the communication device 104 for presentation to a user. At step 902, the virtual sticky note client 110 can receive a user input from the communication device 104 requesting to access virtual sticky notes.

At step 904, the virtual sticky note client 110 can generate contextual information representing the context in which the request is generated. For example, the virtual sticky note client 110 can interface with the positioning system of the communication device 104 to determine a present location of the communication device 104. Based on the location, the virtual sticky note client 110 can identify an entity with which the virtual sticky note is to be associated. In another arrangement, the user can identify the entity.

The contextual information also can include a preferred language of the user of the communication device 104. The preferred language can be a user setting in the virtual sticky note client, or the user can be prompted to enter the preferred language via the communication device 104. Other contextual information also can be generated, for instance weather conditions at the time and location in which the request is entered into the communication device 104, traffic conditions at such time and place, etc.

If the context of the virtual sticky note is related to an entity at a particular location, at step 904 the virtual sticky note client 110 can prompt the user to indicate whether to associate the virtual sticky note only with that entity, or with that entity and other related entities. In illustration, the virtual sticky note client can interface with the positioning system of the communication device, and any other suitable data sources, to identify the entity based on user inputs and/or the present location of the communication device 104. In one arrangement, the contextual information also can include information received from the user indicating a type of virtual sticky note content to be presented, for example reviews, product information, etc.

At step 906 the virtual sticky note client 110 can communicate a message to the content/context manager 122 requesting the virtual sticky notes. The message can include the contextual information. At step 908, the content/context manager 122 can communicate a message to the user preferences data store 140 requesting the user preferences associated with the user. In response to the message, the user preferences data store 140 can retrieve the user settings and, at step 910, communicate the user settings to the content/context manager 122. The user preferences may include a preferred language in which to present the virtual sticky notes, though this need not be the case if the preferred language was conveyed in the contextual information received from the virtual sticky note client 110.

At step 912, the content/context manager 122 can communicate a message to the virtual sticky note client 110 requesting an indication as to the format in which to present the content of the virtual sticky notes. In response, at step 914, the virtual sticky note client 110 can communicate a message to the content/context manager 122 indicating the format. In one arrangement, the virtual sticky note client 110 can provide the decision based on user preferences saved locally by the virtual sticky note client 110, or the virtual sticky note client 110 can prompt the user to enter a user selection. Examples of various formats include, but are not limited to, presenting the entire content of each virtual sticky note, presenting a summary of one or more virtual sticky notes, presenting a hyperlink to one or more sticky notes, aggregating content from multiple virtual sticky notes into a single virtual sticky note, and so on.

At step 916, the content/context manager 122 can communicate a message to the aggregation agent 134 requesting virtual sticky notes. The message can indicate the format in which to present the virtual sticky notes and contextual information to be used for selecting the virtual sticky notes based on their content. The contextual information can include the information received from the virtual sticky note client 110 at step 904, settings retrieved from the user preferences data store 140 at step 908, or any other suitable information. Further, content/context manager 122 can communicate the contextual information to the aggregation agent 134 in a message requesting relevant virtual sticky notes.

At step 918, the aggregation agent 134 can communicate a message to the location management data store 136 requesting location information for the entity identified in contextual information. At step 920, the location management data store 136 can retrieve the requested location information and communicate the location information to the aggregation agent 134.

At step 922, the aggregation agent 134 can communicate a message to the virtual sticky note data store 138 requesting the relevant virtual sticky notes. Such message can indicate a preferred language in which the virtual sticky notes are to be presented. The message can include the contextual information received from the content/context manager 122 and the location information received from the location management data store 136. At step 924, the virtual sticky note data store 138 can retrieve virtual sticky note data corresponding to the contextual information and communicate that virtual sticky note data to the aggregation agent 134.

If one or more of the virtual sticky notes are not currently available in the preferred language, the aggregation agent 134 can communicate those virtual sticky notes (e.g., full content and/or summaries of the virtual sticky notes) to the translation agent requesting the translation agent to translate the virtual sticky notes into the preferred language (now shown in FIG. 9). In response, the translation agent can translate the virtual sticky notes and communicate to the aggregation agent 134 a message containing the translated virtual sticky notes. Such messages can be communicated directly between the aggregation agent 134 and the translation agent, or communicated via the content/context manager 122.

If summaries of one or more virtual sticky notes are to be presented, at step 926 the aggregation agent 134 can process the context of a respective virtual sticky note and access a dictionary of commonly relevant virtual sticky note terms in order to summarize the content. For example, sentences or portions of sentences to be included in each summary can be selected based on terms contained therein. The terms can be weighted depending on how closely they match the received parameters and whether they are contained in the dictionary. Moreover, weights can be associated with the terms contained in the dictionary, and such dictionary term weights can provide at least a portion of the total weight given to a term. The sentences, or portions of sentences, which include the terms having the greatest weight can be included in the summary. The number of sentences, or portions thereof, that are included in the summary can be based on the amount of reduction being applied by the aggregation agent 134.

The amount that the content of each virtual sticky note is condensed during the summarization process can be based on the age of the virtual sticky notes, the amount of user access to the virtual sticky note, the frequency at which the virtual sticky note is accessed, the summary reduction rate associated with the virtual sticky note, and so on.

In one arrangement, the amount that the content of each virtual sticky note is compressed can be based on interest clusters, which can comprise sets of virtual sticky notes on a related topic. Summary reduction rates can be subsequently standardized for the virtual sticky notes within a given interest cluster. In this manner, a user may be presented with similar initial visibility for a plurality of virtual sticky notes on a related topic, and these virtual sticky notes likely will be of a similar level of interest to the user.

In another arrangement, the system can identify interest clusters based on historical patterns of accessing a set of virtual sticky notes. For example, a historical pattern can indicate that a first virtual sticky note related to a first subject, a second virtual sticky note related to a second subject, and a third virtual sticky note related to a third subject, have been accessed by multiple users in that sequence within a particular period.

In another arrangement, in lieu of performing step 926 in response to a request by the content/context manager 122, the aggregation agent 134 can automatically reduce/summarize virtual sticky notes at defined intervals. For example, the length of the summary for each virtual sticky note can be further reduced at an interval defined by the summary reduction rate. Moreover, virtual sticky notes that are beyond a certain age, or that are rarely used, can be deleted. Accordingly, stale sticky notes can be removed from the management system 120, thereby reducing the amount of storage capacity that is used and ensuring higher quality virtual sticky note content.

At step 928, the virtual sticky notes can be communicated to the content/context manager 122 in the preferred language and the requested content format. For instance, the entire content of the selected virtual sticky notes can be communicated, the summaries of the virtual sticky notes can be communicated, or both the summaries and the entire content can be communicated. In another arrangement the summaries of a plurality of virtual sticky notes can be aggregated into a single virtual sticky note. During the aggregation process, the aggregation agent 134 can process the content to exclude redundant information. In yet another arrangement, hyperlinks to virtual sticky notes can be communicated to the content/context manager 122. For example, hyperlinks can be provided in lieu of summaries for any virtual sticky notes which have summaries that contain less than a threshold number of words, for instance less than seven words.

Further, when a plurality of virtual sticky notes and/or hyperlinks are provided, the aggregation agent 134 can provide an indication of weight or priority for each of the virtual sticky notes/hyperlinks. For instance, the virtual sticky notes can be provided in an order in which they are to be presented, or a weight indicator can be associated with each of the virtual sticky notes. In this regard, the term "weight" relates to a probable level of importance.

At step 930, the virtual sticky notes can be communicated from the content/context manager 122 to the virtual sticky note client 110. At step 932, the virtual sticky note client can present the virtual sticky notes (e.g., summaries of the virtual sticky notes or the entire content of the virtual sticky notes) to a user via the communication device 104. In an arrangement in which sticky note summaries or hyperlinks are provided in lieu of the entire content of a virtual sticky note, if a user selects a desired virtual sticky note summary or hyperlink, the virtual sticky note client 110 can cause the entire content of the virtual sticky note to be presented. If the entire virtual sticky note has not already been received, the virtual sticky note client 110 can communicate a request to the content/context manager 122 to retrieve the entire content.

If the user to whom a virtual sticky note is being presented is the original poster of that virtual sticky note or is otherwise authorized to amend or update the virtual sticky note, the virtual sticky note client 110 can receive user inputs via the communication device 104 to amend or update the virtual sticky note. The virtual sticky note client 110 then can communicate the virtual sticky note to the content/context manager 122 to be saved, for instance in accordance with the method 500 depicted in FIGS. 5-8.

Figure 10:
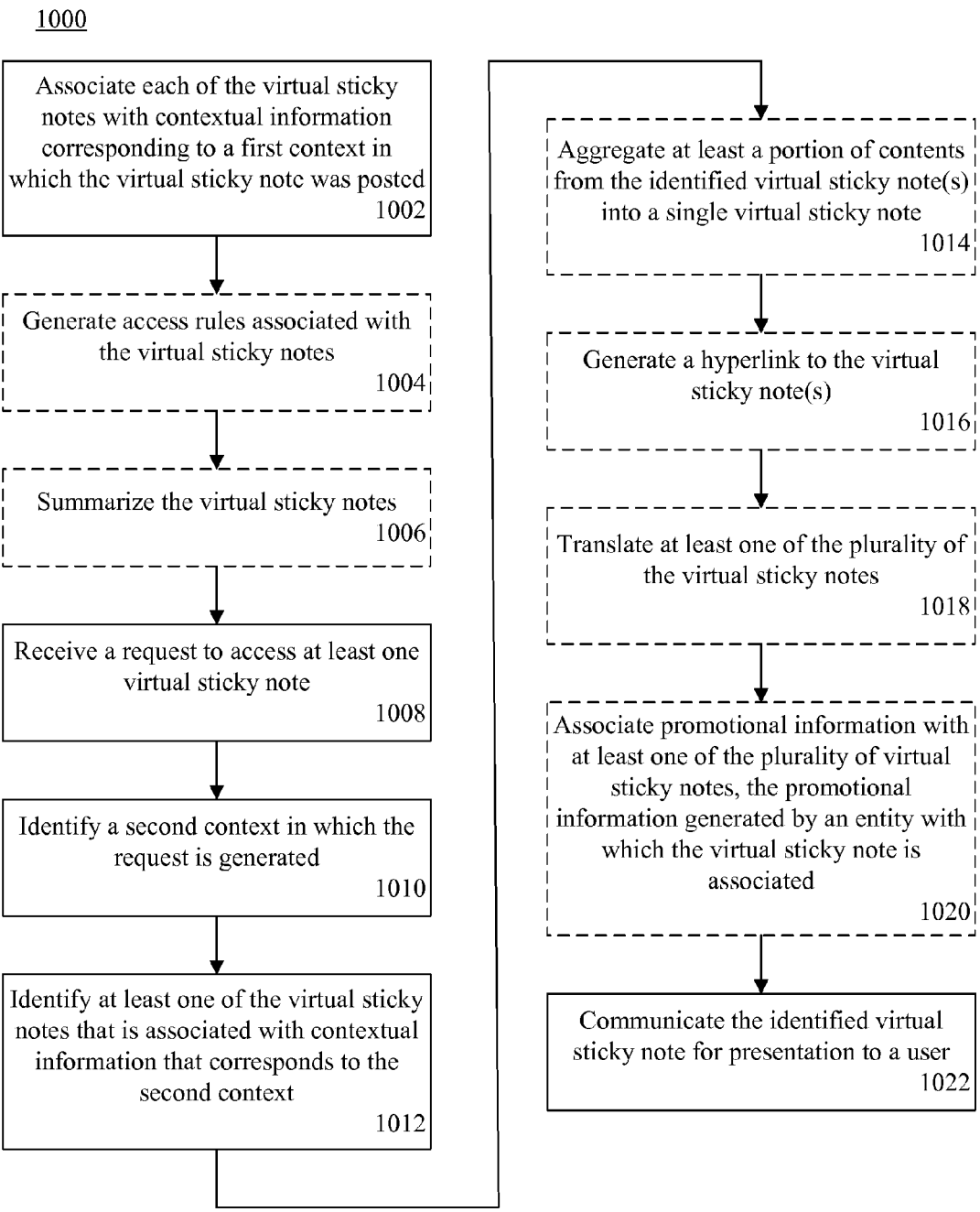
FIG. 10 is a flowchart presenting a method of managing a collection of virtual sticky notes that is useful for understanding the present invention.

FIG. 10 is a flowchart presenting a method 1000 of managing a collection of a plurality of virtual sticky notes that is useful for understanding the present invention. At step 1002, each of the sticky notes can be associated with contextual information corresponding to a first context in which the respective virtual sticky notes were posted. At step 1004, optimally, access rules associated with the virtual sticky notes can be generated.

Optionally, at step 1006 the virtually sticky notes can be summarized. In another arrangement, the virtual sticky notes can be summarized prior to the method 1000 being initiated. In yet another arrangement, the virtual sticky notes need not be summarized.

At step 1008 a request to access at least one virtual sticky note can be received. At step 1010 a second context in which the request was generated can be identified. At step 1012 at least one of the virtual sticky notes that is associated with contextual information that corresponds to the second context can be identified.

Optionally, at step 1014, at least a portion of contents from the identified virtual sticky note(s) can be aggregated into a single virtual sticky note. Further, at step 1016 a hyperlink to the virtual sticky note(s) can be generated. At step 1018 at least one of the plurality of sticky notes can be translated. At step 1020 promotional information can be associated with at least one of the plurality of virtual sticky notes. The promotional information can be generated by an entity with which the virtual sticky note is associated.

At step 1022 the identified virtual sticky note(s) can be communicated for presentation to a user.

The signal flow diagrams, flow chart and block diagram in the figures illustrate the architecture, functionality, and operation of possible implementations of systems, methods and computer program products according to various embodiments of the present invention. In this regard, each block in the signal flow diagram, flow chart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Further, when an indication of a message being communicated is described, it will be understood by those skilled in the art that one or more messages may be communicated. For instance, in lieu of a single message being communicated between components, a plurality of messages may be communicated to achieve the same result.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "application," "computer program," "software," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of managing a collection of a plurality of virtual sticky notes, the method executable by a computer and comprising:

the computer associating each of the virtual sticky notes with contextual information corresponding to a first context in which the virtual sticky note was posted; and in response to receiving a request to access at least one of the virtual sticky notes, the computer:

identifying a second context in which the request is generated;

identifying at least one of the virtual sticky notes that is associated with contextual information that corresponds to the second context;

automatically summarizing the at least one of the plurality of virtual sticky notes in accordance with a summary reduction rate that indicates a frequency at which a content of the virtual sticky note is further summarized over time; and communicating the summarized virtual sticky note to a communication device for presentation to a user.

2. The method of claim 1, further comprising:
the computer automatically aggregating at least a portion of contents from the identified virtual sticky note into a single virtual sticky note;
wherein communicating the summarized virtual sticky note for presentation to the user comprises communicating the single virtual sticky note for presentation to the user.

3. The method of claim 1, further comprising:
the computer automatically generating at least one hyperlink to the virtual sticky note;
wherein communicating the summarized virtual sticky note for presentation to the user comprises communicating the hyperlink for presentation to the user.

4. The method of claim 1, further comprising:
the computer automatically translating at least one of the plurality of the virtual sticky notes;
wherein communicating the summarized virtual sticky note for presentation to the user comprises communicating the translated summarized virtual sticky note for presentation to the user.

5. The method of claim 4, wherein automatically translating at least one of the plurality of the virtual sticky notes comprises:
translating the virtual sticky note into at least one language commonly spoken in a geographic region in which the virtual sticky note was generated.

6. The method of claim 1, further comprising:
the computer generating an access rule associated with the virtual sticky note.

7. The method of claim 1, further comprising:
the computer associating promotional information with at least one of the plurality of virtual sticky notes, the promotional information generated by an entity with which the virtual sticky note is associated.

8. The method of claim 7, further comprising:
generating access rules associated with the promotional information.

9. A computer program product comprising:
a computer-usable medium comprising computer-usable program code that manages a collection of a plurality of virtual sticky notes, the computer-usable medium comprising:

computer-usable program code that associates each of the virtual sticky notes with contextual information corresponding to a first context in which the virtual sticky note was posted;

computer-usable program code that, in response to receiving a request to access at least one of the virtual sticky notes, identifies a second context in which the request is generated;

computer-usable program code that automatically summarizes at least one of the plurality of virtual sticky notes in accordance with a summary reduction rate that indicates a frequency at which a content of the virtual sticky note is further summarized over time; and computer-usable program code that, in response to receiving a request to access at least one virtual sticky note, communicates the summarized virtual sticky note for presentation to a user.

10. The computer program product of claim 9, the computer-usable medium further comprising:
computer-usable program code that automatically aggregates at least a portion of contents from each of the identified virtual sticky notes into a single virtual sticky note;
wherein the computer-usable program code that communicates the summarized virtual sticky note for presentation to a user comprises:
computer-usable program code that communicates the single virtual sticky note for presentation to the user.

11. The computer program product of claim 9, the computer-usable medium further comprising:
computer-usable program code that automatically generates at least one hyperlink to the virtual sticky note;
wherein the computer-usable program code that communicates the summarized virtual sticky note for presentation to a user comprises:
computer-usable program code that communicates the hyperlink for presentation to the user.

12. The computer program product of claim 9, the computer-usable medium further comprising:
computer-usable program code that automatically translates at least one of the plurality of the virtual sticky notes;
wherein the computer-usable program code that communicates the summarized virtual sticky note for presentation to a user comprises:
computer-usable program code that communicates the translated summarized virtual sticky note for presentation to the user.

13. The computer program product of claim 12, wherein the computer-usable program code that automatically summarizes each of the plurality of virtual sticky notes comprises:
computer-usable program code that translates the virtual sticky note into at least one language commonly spoken in a geographic region in which the virtual sticky note was generated.

14. The computer program product of claim 9, the computer-usable medium further comprising:
computer-usable program code that generates an access rule associated with the virtual sticky note.

15. The computer program product of claim 9, the computer-usable medium further comprising:
computer-usable program code that associates promotional information with at least one of the plurality of virtual sticky notes, the promotional information generated by an entity with which the virtual sticky note is associated.

16. The computer program product of claim 9, the computer-usable medium further comprising:

computer-usable program code that generates access rules associated with the promotional information.

* * * * *